No. 608,262. Patented Aug. 2, 1898.
J. S. LORD.
BICYCLE ATTACHMENT.
(Application filed July 15, 1895.)
(No Model.) 2 Sheets—Sheet 1.

No. 608,262. Patented Aug. 2, 1898.
J. S. LORD.
BICYCLE ATTACHMENT.
(Application filed July 15, 1895.)
(No Model.) 2 Sheets—Sheet 2.

Witnesses: W. J. Sankey, R. C. Orwig.
Inventor: John S. Lord, By Thomas G. and J. Ralph Orwig, Attorneys.

THE NORRIS PETERS CO., PHOTO-LITHO., WASHINGTON, D. C.

UNITED STATES PATENT OFFICE.

JOHN S. LORD, OF DES MOINES, IOWA.

BICYCLE ATTACHMENT.

SPECIFICATION forming part of Letters Patent No. 608,262, dated August 2, 1898.

Application filed July 15, 1895. Serial No. 556,020. (No model.)

*To all whom it may concern:*

Be it known that I, JOHN S. LORD, a citizen of the United States of America, residing at Des Moines, in the county of Polk and State of Iowa, have invented a new and useful Bicycle Attachment, of which the following is a specification.

The object of this invention is to provide a device that may be readily and quickly applied to or removed from any safety-bicycle and in which a second person may be comfortably and conveniently carried.

My invention consists in the construction of the device and the means for detachably connecting it to a bicycle, as hereinafter set forth, pointed out in my claims, and illustrated in the accompanying drawings, in which—

Figure 1:
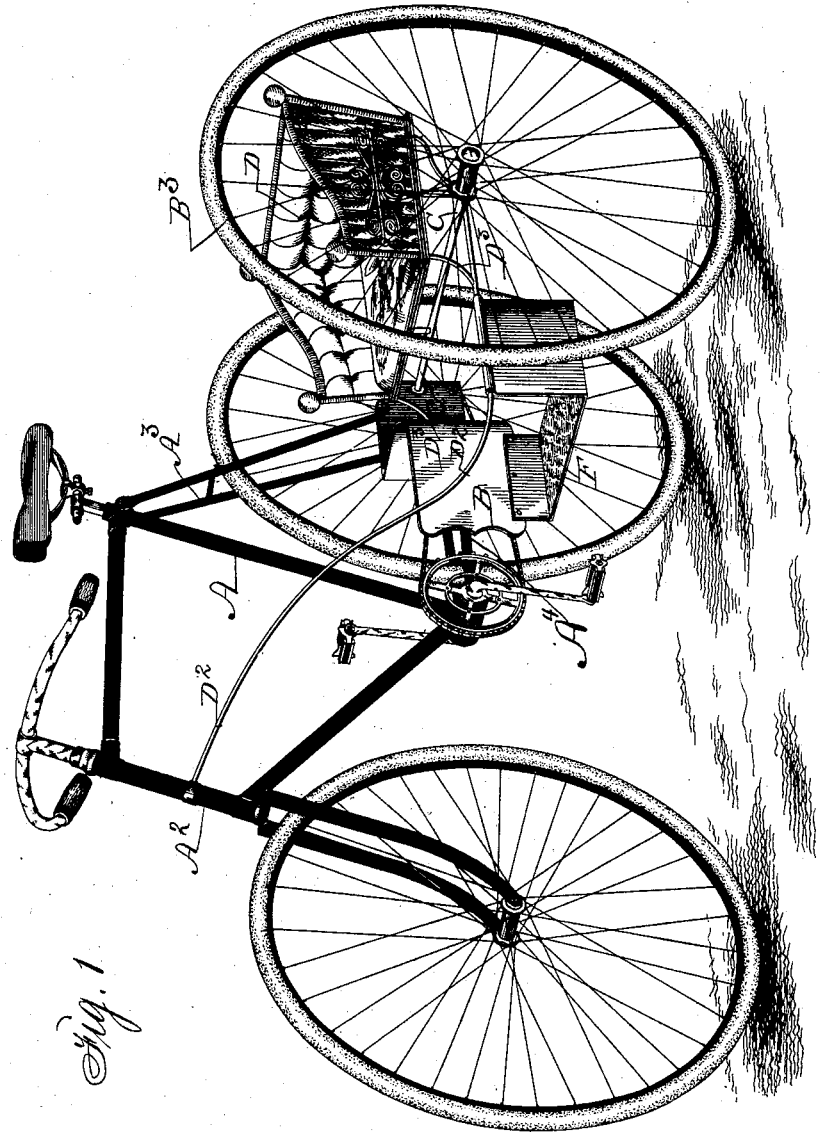
Figure 2:
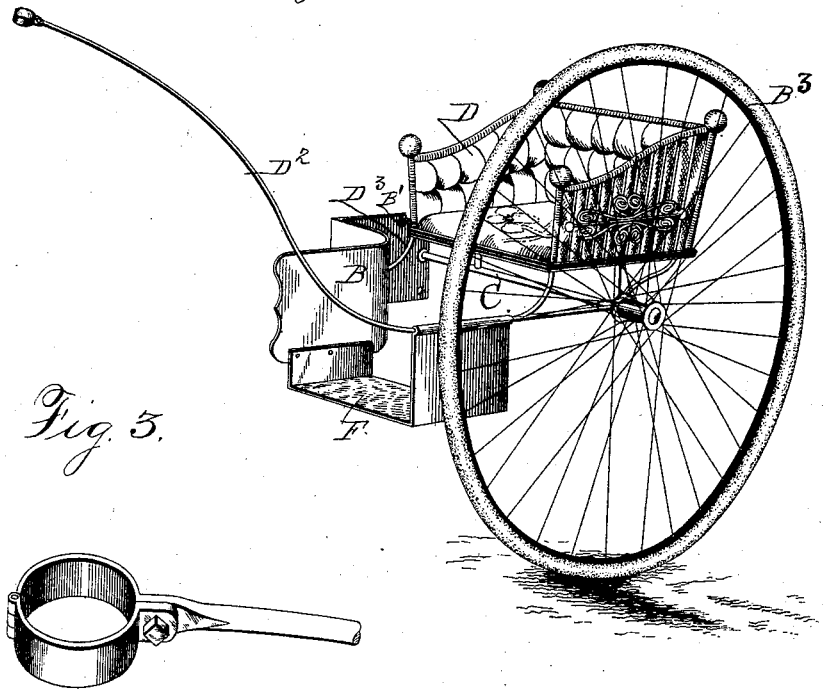
Figure 3:
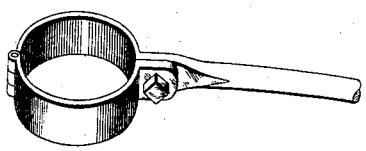
Figure 4:
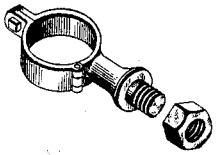
Figure 5:
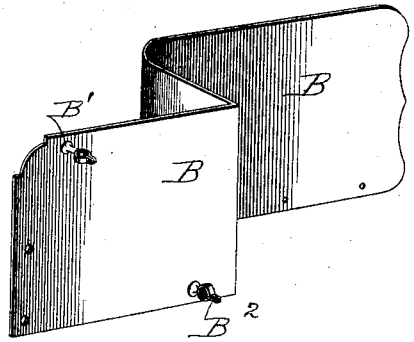

Figure 1 shows in perspective the complete attachment applied to a bicycle as in common use, and Fig. 2 shows it detached. Fig. 3 is an enlarged perspective view of a clamping device for detachably fastening the frame of the attachment to the front and upper portion of the frame of the bicycle. Fig. 4 is an enlarged perspective view of a clamp for fastening the attachment to the rear and lower portion of the bicycle-frame. Fig. 5 is a perspective view of a portion of the frame of the attachment made of sheet metal.

Referring to the accompanying drawings, the reference-letter A is used to indicate the bicycle, which is of the diamond-frame safety pattern and is of ordinary construction, the parts thereof, which will be specifically referred to hereinafter, being the steering-head $A^2$, the rear fork $A^3$, and the parallel side pieces of the frame at the sides of the rear wheel.

The attachment comprises a sheet-metal part B, provided with an opening to admit the rear axle of the bicycle, an opening at its upper rear end to admit a clamping-bolt B', and an opening to admit a like bolt $B^2$, that clamps to the part $A^4$ of the frame. This plate is curved outwardly from the bicycle and then forwardly for the purpose of allowing room for the movement of the pedals and serving as a dress-guard for the person occupying the auxiliary seat and as a bearing for the attachment-axle C, that is in an elevated position relative to the bicycle-axle, as required for the wheel $B^2$, that is larger in diameter than the bicycle-wheels.

C indicates an axle having its one end fixed in the plate B and extended straight outwardly therefrom, and having a wheel $B^3$ rotatably mounted on its outer end. This wheel $B^3$ is preferably a little larger than the rear bicycle-wheel, and thus aids in maintaining the center of gravity of the complete three-wheeled vehicle and the weight thereon in alinement with the line of advance followed by the bicycle-wheels, and thereby preventing the side draft that would occur if the two bicycle-wheels remained perpendicular.

D indicates a seat supported from the axle C. This may be made of any suitable size or shape.

$D^2$ indicates a brace extending from the outer end of the rear axle to the steering-head. The front end of the seat is supported by rods $D^3$, one of which is connected with said brace and the other with the plate B.

F indicates a foot-rest supported from the brace D at one side and the plate B at the other.

Having thus described my invention, what I claim as new therein, and desire to secure by Letters Patent of the United States therefor, is—

1. An attachment for bicycles comprising a curved sheet-metal plate adapted to serve as an axle-support and dress-guard, means for securing it to the side of a bicycle-frame, an axle mounted thereon, a wheel on the outer end of the axle, a seat mounted on the axle, a brace attached to the outer end of the axle and adapted to be connected with the steering-head of a bicycle, and a foot-rest supported by said brace and plate, for the purposes stated.

2. In an attachment for bicycles, an axle-bearing and dress-guard consisting of the bent plate B adapted to be fixed to a bicycle-frame to support an axle in a plane above the axle of the bicycle-wheel, clamping devices B' and $B^2$, a wheel on the end of the said attachment-axle having a larger diameter than the bicycle-wheel to apply in the manner set forth for the purposes stated.

JOHN S. LORD.

Witnesses:
REUBEN S. ORWIG,
THOMAS G. ORWIG.